United States Patent
Herrmann et al.

(10) Patent No.: US 9,274,003 B2
(45) Date of Patent: Mar. 1, 2016

(54) IMAGE PIXEL APPARATUS FOR DETECTING ELECTROMAGNETIC RADIATION, SENSOR ARRAY FOR DETECTING ELECTROMAGNETIC RADIATION AND METHOD FOR DETECTING ELECTROMAGNETIC RADIATION BY MEANS OF AN IMAGE PIXEL APPARATUS

(71) Applicant: Robert Bosch GmbH, Stuttgart (DE)

(72) Inventors: Ingo Herrmann, Friolzheim (DE); Christoph Schelling, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 14/071,306

(22) Filed: Nov. 4, 2013

(65) Prior Publication Data

US 2014/0124671 A1    May 8, 2014

(30) Foreign Application Priority Data

Nov. 7, 2012    (DE) .......................... 10 2012 220 207

(51) Int. Cl.
G01J 5/00    (2006.01)
G01J 5/10    (2006.01)
G01J 5/20    (2006.01)
G01J 5/08    (2006.01)

(52) U.S. Cl.
CPC .................. G01J 5/10 (2013.01); G01J 5/0853 (2013.01); G01J 5/20 (2013.01)

(58) Field of Classification Search
CPC .............. G01J 5/10; G01J 5/0853; G01J 5/20
See application file for complete search history.

(56) References Cited

U.S. PATENT DOCUMENTS

| | | | |
|---|---|---|---|
| 6,552,344 B1 | 4/2003 | Sone et al. | |
| 2002/0034878 A1 | 3/2002 | Kimata et al. | |
| 2005/0178967 A1 | 8/2005 | Nakaki et al. | |
| 2006/0000974 A1 | 1/2006 | Brouns | |
| 2010/0187419 A1* | 7/2010 | Hu ............................ | G01J 5/02 250/338.1 |
| 2013/0087707 A1* | 4/2013 | Park et al. .................. | 250/338.4 |
| 2013/0112876 A1* | 5/2013 | Nam et al. ................. | 250/338.1 |
| 2013/0161515 A1* | 6/2013 | Park et al. .................. | 250/338.1 |

(Continued)

FOREIGN PATENT DOCUMENTS

| | | |
|---|---|---|
| DE | 692 16 862 T2 | 6/1997 |
| DE | 10 2006 028 435 A1 | 12/2007 |

(Continued)

OTHER PUBLICATIONS

Ogawa, S. et al., Wavelength selective uncooled infrared sensor by plasmonics, Applied Physics Letters, Jan. 11, 2012, pp. 021111 1-4, vol. 100, American Institute of Physics.

*Primary Examiner* — Casey Bryant
(74) *Attorney, Agent, or Firm* — Maginot, Moore & Beck LLP

(57) ABSTRACT

An image pixel apparatus for detecting electromagnetic radiation includes an absorption structure device configured to absorb the electromagnetic radiation and to take it up as a quantity of heat. At least one plasmonic resonance structure device of the apparatus is configured to forward the electromagnetic radiation to the absorption structure device. A detection device that has at least one detection element is configured to detect the electromagnetic radiation by way of changes in an electrical property of the at least one detection element that are caused by the quantity of heat taken up.

15 Claims, 4 Drawing Sheets

(56) References Cited

U.S. PATENT DOCUMENTS

2014/0175284 A1* 6/2014 Roh et al. .................. 250/338.4
2014/0217289 A1* 8/2014 Nam et al. ............... 250/339.01

FOREIGN PATENT DOCUMENTS

EP          2 450 681 A1    5/2012
WO          2008018082 A2   2/2008

* cited by examiner

IMAGE PIXEL APPARATUS FOR DETECTING ELECTROMAGNETIC RADIATION, SENSOR ARRAY FOR DETECTING ELECTROMAGNETIC RADIATION AND METHOD FOR DETECTING ELECTROMAGNETIC RADIATION BY MEANS OF AN IMAGE PIXEL APPARATUS

This application claims priority under 35 U.S.C. §119 to patent application no. DE 10 2012 220 207.2 filed on Nov. 7, 2012 in Germany, the disclosure of which is incorporated herein by reference in its entirety.

BACKGROUND

The disclosure relates to an image pixel apparatus for detecting electromagnetic radiation, a sensor array for detecting electromagnetic radiation and a method for detecting electromagnetic radiation by means of an image pixel apparatus.

U.S. Pat. No. 6,552,344 B1 describes an infrared detector and a method for producing an infrared detector.

DE 692 16 862 T2 describes a monolithically integrated microbolometer sensor for infrared radiation comprising a monolithic semiconductor main body having a plurality of depressions and a plurality of dielectric thin-film elements. The plurality of dielectric thin-film elements have a depression with embedded vanadium oxide.

DE 10 2006 028 435 A1 describes a sensor for spatially resolved infrared radiation detection, having a substrate, at least one microstructured sensor element having an electrical property which changes its value in a temperature-dependent manner, and a membrane above a cavity, wherein the sensor element is arranged on the underside of the at least one membrane.

Furthermore, in the case of the sensor described therein, contact is made with the sensor element via leads running in, on or below the membrane. In that case, suspension springs are embodied in the membrane, said suspension springs taking up the individual sensor elements elastically and in an insulating manner.

US 2005 017 896 7 A1 describes an infrared sensor comprising a substrate having a concave section, a temperature detecting section, which is connected to the substrate via a supporting leg at an upper part of a space in the concave section. Furthermore, the infrared sensor described therein comprises an infrared-reflecting film and an infrared-absorbing hood section opposite the infrared-reflecting film.

US 2002 003 487 8 A1 describes a method for producing an infrared image sensor, wherein a multiplicity of etched holes are produced in a semiconductor substrate by etching in order to embody at least one hollow section in the semiconductor substrate.

SUMMARY

The present disclosure provides an image pixel apparatus for detecting electromagnetic radiation, a sensor array for detecting electromagnetic radiation, and a method for detecting electromagnetic radiation by means of an image pixel apparatus.

The concept of the disclosure is that of providing a sensor array for detecting electromagnetic radiation comprising at least one image pixel apparatus which has a low heat capacity and a low thermal coupling to the substrate and thus enables a high image refresh frequency. As a result, the pixel can be reduced in size for the same signal-to-noise ratio and thus be produced more cost-effectively.

The essence of the disclosure is the improvement of the absorption properties of the absorber layer through the use of at least one plasmonic resonance structure.

This advantageously makes it possible to bring about an increase in the filling factor of the pixel by means of the absorber screen. Furthermore, light from a larger range can be utilized for generating a signal of the image pixel apparatus. This advantageously makes it possible to increase the signal-to-noise ratio.

Advantageous embodiments and developments are evident from the dependent claims and from the description with reference to the figures.

In accordance with one embodiment of the disclosure it is provided that the absorption structure device is embodied in a manner spaced apart from the detection device and/or the absorption structure device is coupled to the detection device via at least one thermal bridge. As a result, a reliable detection of the electromagnetic radiation can be performed by the image pixel apparatus.

In accordance with one embodiment of the disclosure it is provided that the absorption structure device is embodied at a distance from the detection device amounting to a multiple of one quarter of a wavelength of interest of the electromagnetic radiation.

In accordance with one embodiment of the disclosure it is provided that, instead of the detection device, the at least one detection element is coupled to the absorption structure device via at least one thermal bridge.

In accordance with one embodiment of the disclosure it is provided that the absorption structure device is embodied as a layer which absorbs the electromagnetic radiation.

In accordance with one embodiment of the disclosure it is provided that an optical thickness of the absorbent layer is a multiple of one quarter of a wavelength of the electromagnetic radiation.

In accordance with one embodiment of the disclosure it is provided that the at least one plasmonic resonance structure device is embodied on at least one surface of the absorption structure device. This allows simple production of the image pixel apparatus.

In accordance with one embodiment of the disclosure it is provided that the at least one plasmonic resonance structure device is embodied as a metallic plasmonic resonance structure device. This makes it possible to improve the absorption in the absorption structure device.

In accordance with one embodiment of the disclosure it is provided that the image pixel apparatus furthermore comprises a reflector device embodied on at least one surface of the absorption structure device. This allows a simple and compact construction of the image pixel apparatus.

In accordance with one embodiment of the disclosure it is provided that the image pixel apparatus furthermore comprises a coupling device, which is designed to couple the detection device and/or the absorption structure device to a substrate.

The configurations and developments described can be combined with one another in any desired manner.

Further possible configurations, developments and implementations of the disclosure also encompass combinations—not explicitly mentioned—of features of the disclosure described above or below with regard to the exemplary embodiments.

BRIEF DESCRIPTION OF THE DRAWINGS

The accompanying drawings are intended to convey a further understanding of the embodiments of the disclosure.

They illustrate embodiments and serve in association with the description to illustrate principles and concepts of the disclosure.

Figure 1:
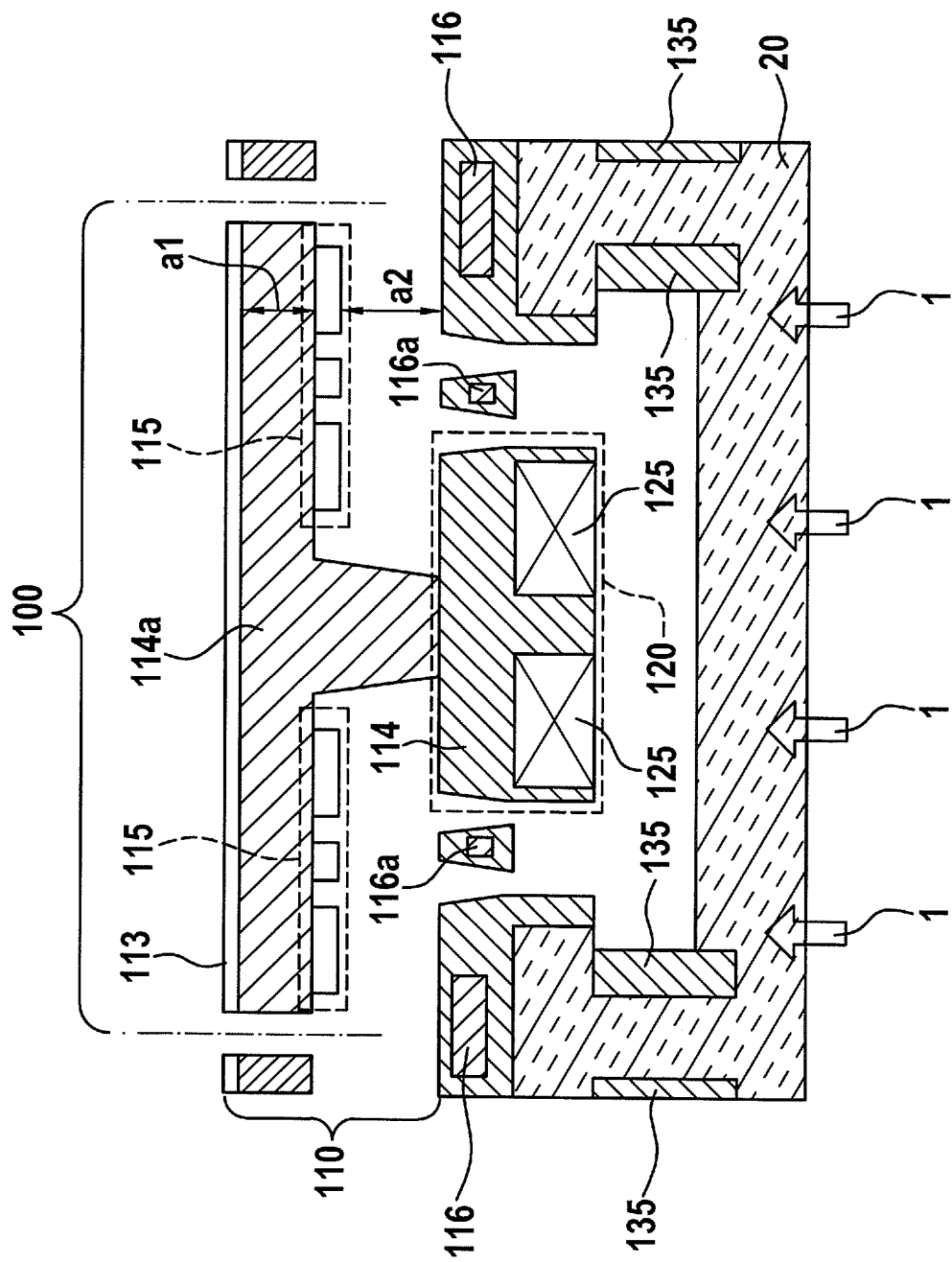

Other embodiments and many of the advantages mentioned are evident in view of the drawings. The illustrated elements in the drawings are not necessarily shown in a manner true to scale with respect to one another.

Figure 2:
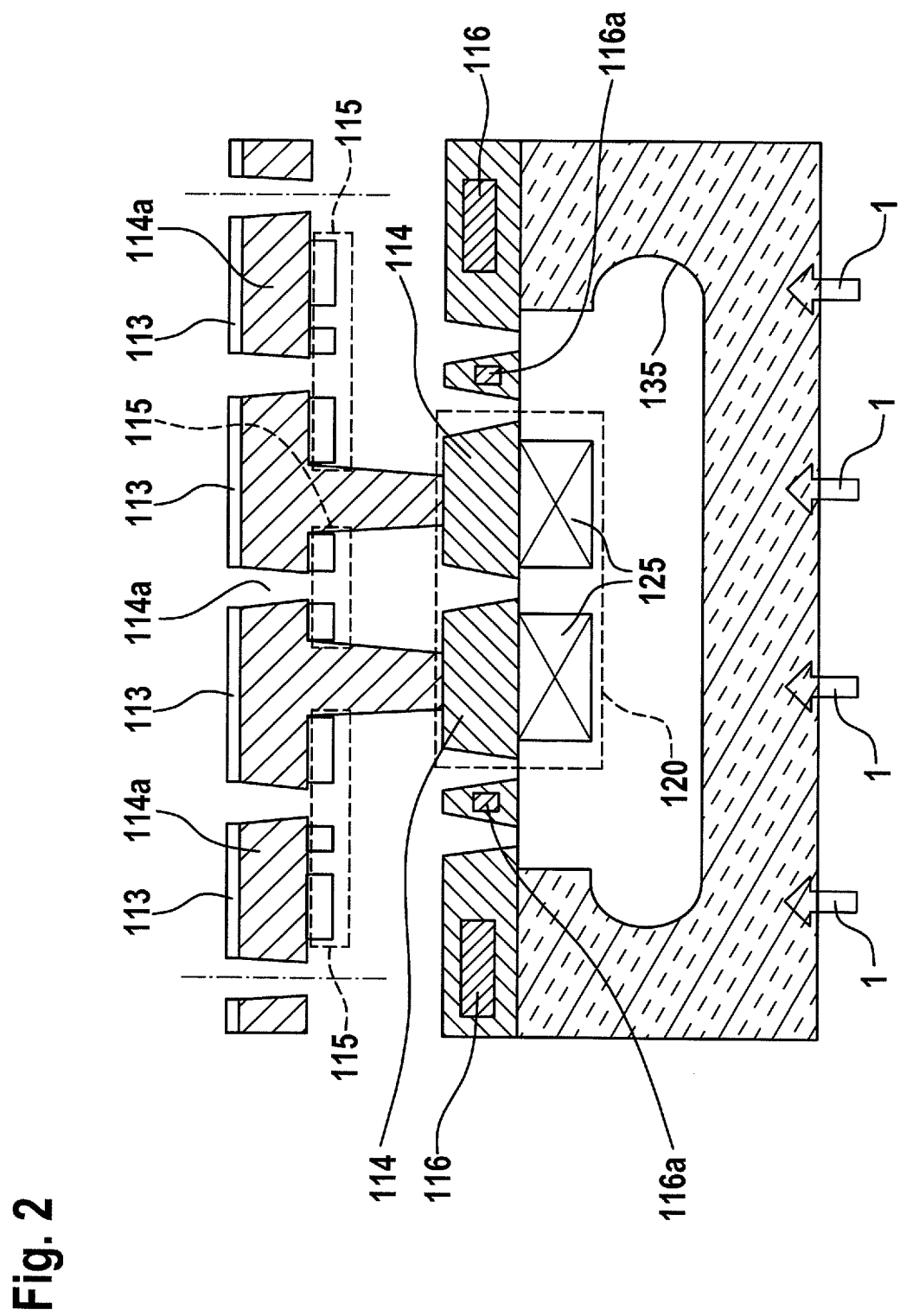
Figure 3:
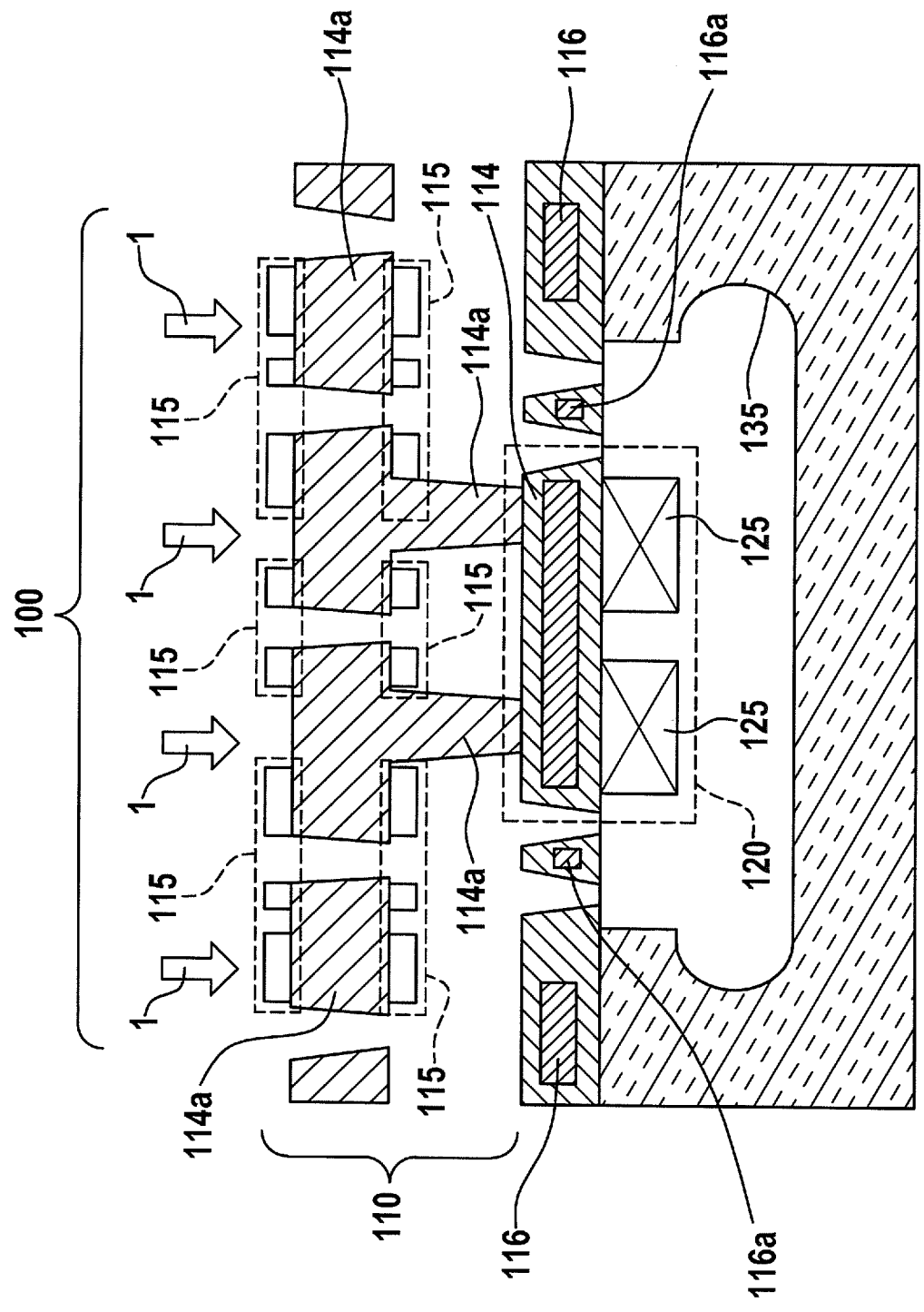
Figure 4:
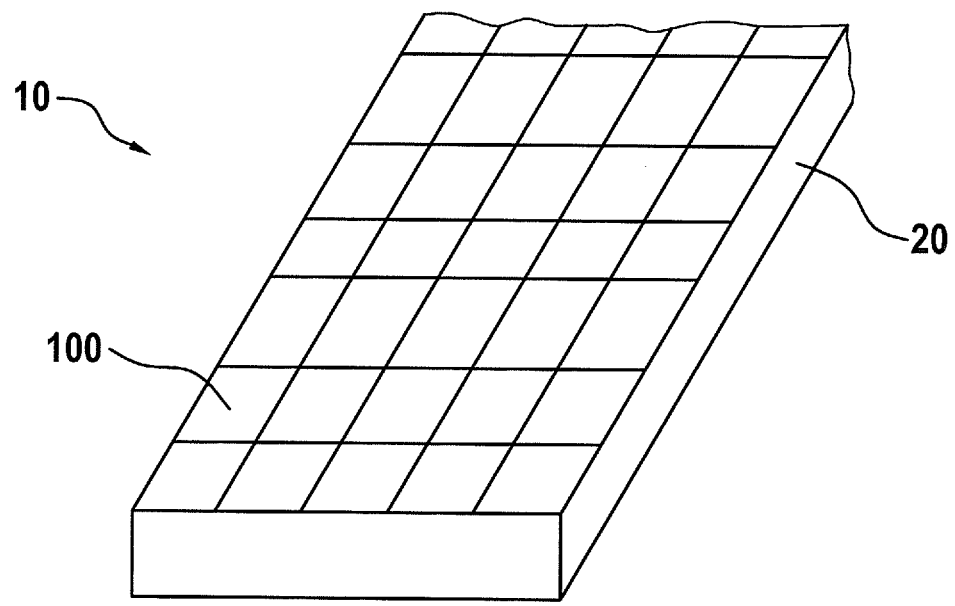
Figure 5:
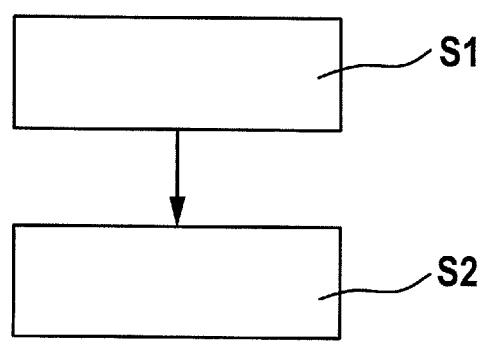

In the figures:

FIG. 1 shows a schematic illustration of an image pixel apparatus for detecting electromagnetic radiation in accordance with one embodiment of the disclosure;

FIG. 2 shows a schematic illustration of an image pixel apparatus for detecting electromagnetic radiation in accordance with a further embodiment of the disclosure;

FIG. 3 shows a schematic illustration of an image pixel apparatus for detecting electromagnetic radiation in accordance with yet another embodiment of the disclosure;

FIG. 4 shows a schematic illustration of a sensor array for detecting electromagnetic radiation in accordance with yet another embodiment of the disclosure; and FIG. 5 shows a schematic illustration of a flow chart of a method for detecting electromagnetic radiation by means of an image pixel apparatus in accordance with yet another embodiment of the disclosure.

DETAILED DESCRIPTION

In the figures of the drawings, identical reference signs designate identical or functionally identical elements, structural parts, components or method steps, unless indicated to the contrary.

FIG. 1 shows a schematic illustration of an image pixel apparatus for detecting electromagnetic radiation in accordance with one embodiment of the disclosure.

Infrared radiation, IR radiation for short, or electromagnetic waves in the spectral range between visible light and the longer-wave terahertz radiation can be detected as the electromagnetic radiation. The spectral range between approximately 1 mm and 780 nm can be designated as infrared radiation, which corresponds to a frequency range of 300 GHz to 400 THz.

An image pixel apparatus 100 for detecting electromagnetic radiation 1 comprises, for example, an absorption structure device 110 with at least one plasmonic resonance structure device 115, which is designed to forward the electromagnetic radiation 1 to the absorption structure device 110.

Furthermore, the image pixel apparatus 100 can comprise a detection device 120 having at least one detection element 125 designed to detect the quantity of heat taken up and thereby to detect the electromagnetic radiation 1.

The absorption structure device 110 of the image pixel apparatus 100 converts the incident radiation into heat by absorption and forwards said heat to the detection device 120. The heat taken up by the detection device 120 and the change—caused thereby—in the temperature of the at least one detection element 125 of the detection device 120 changes the electrical properties of the at least one detection element 125 of the detection device 120.

As the electrical properties of the at least one detection element 125, by way of example, changes in the electrical resistance of the at least one detection element 125 may be caused by the change in temperature and be detected by the detection device 120.

The absorption structure device 110 of the image pixel apparatus 100 can be coupled to a substrate 20 by a coupling device 135, wherein the coupling device 135 can be embodied for mechanical anchoring to the substrate 20 and/or for electrical connection to the substrate 20 and/or for thermal insulation from the substrate 20.

The absorption structure device 110 of the image pixel apparatus 100 can comprise a material that absorbs infrared rays, such as, for instance, doped silicon oxide or doped gallium arsenide or some other semiconductor that absorbs infrared rays, such as germanium, for instance.

The absorption structure device 110 can furthermore be embodied as a layer system having a plurality of absorber layers 114, 114a which each have a line or column metallization 114a, 116a.

With an absorption structure device 110 arranged in a screen-type manner above the image pixel apparatus 100, electromagnetic radiation 1 can thus be detected by the image pixel apparatus 100 over a laterally extended region that is larger than the detection device 120.

The at least one plasmonic resonance structure device 115 of the image pixel apparatus 100 can be embodied as a metamaterial or as an artificially produced structure whose permittivity and permeability to electrical and magnetic fields deviate from the values customary in nature.

These properties of the plasmonic resonance structure device 115 can be achieved by means of specially produced, usually periodic, microscopically fine structures, such as, for instance, cells or individual elements composed of electrical or magnetically active materials in the interior or on one of the surfaces of the absorption structure device 110.

Furthermore, the wavelength-dependent probability of absorption of the incident electromagnetic radiation can be increased by means of a correspondingly chosen distance a2 between the absorption structure device 110 and the detection device 120 and/or by means of a correspondingly chosen optical thickness a1 of the absorption structure device 110.

The optical thickness a1 can be an odd multiple of one quarter of a wavelength of the electromagnetic radiation 1.

The plasmonic resonance structure device 115 can be spaced apart from a surface of one of the plurality of absorber layers 114 by a distance a2.

The absorption structure device 110 of the image pixel apparatus 100 is coupled to the detection device 120 for example at at least one point. The coupling serves for mechanically fixing the absorption structure device 110 to the image pixel apparatus 100.

Furthermore, the coupling can advantageously form a thermal bridge between the absorption structure device 110 and the detection device 120, in order to feed the heat produced by absorption in the absorption structure device 110 to the detection device 120.

In the case of a plurality of detection elements 125 per detection device 120, a bridge for each of the detection elements 125 can be advantageous.

The absorption can be increased further by means of a plasmonic resonance structure device 115 integrated on at least one surface of the absorption structure device 110.

A reflector device 113 embodied as a reflector layer can be provided either on that surface of the absorption structure device 110 which is situated opposite the plasmonic resonance structure device 115, and/or on the pixel layer construction.

The metallic coverage of the reflector layer, i.e. a layer thickness multiplied by a metal area, can be chosen to be of identical magnitude in the case of the metallization on the opposite surfaces of the absorption structure device 110.

In this way, the construction of the absorption structure device 110 of the image pixel apparatus 110 can be embodied stress-symmetrically and the absorption structure device 110 remains largely stable even across changes in temperature that affect the image pixel apparatus 100.

If different metallizations are used on both sides of the absorption structure device 110, the thickness of the metallic reflector layer can be adapted accordingly.

A perforation provided in the absorption structure device 110 can be used for producing the image pixel apparatus 100.

Furthermore, gold or indium or aluminum or some other metal can be used as metal of the metallic plasmonic resonance structure device 115.

The cavities can be produced for example by etching a sacrificial layer, if appropriate supported by a targeted delimitation of individual cavities by support locations 135. Said support locations 135 can be embodied for example as walls or else as columns.

Likewise, however, anodic etching of the substrate can also be performed, wherein for example porous silicon is produced in the substrate and subsequently removed, such as, for instance, by means of an etching process, or by means of an anodization or by means of electropolishing. Furthermore, it is possible to carry out deep silicon etching methods with a similar effect.

FIG. 2 shows a schematic illustration of an image pixel apparatus for detecting electromagnetic radiation in accordance with a further embodiment of the disclosure.

In a departure from the embodiment shown in FIG. 1, in the embodiment shown in FIG. 2 the image pixel apparatus 100 is the reflector device 113 embodied as a reflector layer likewise plasmonic resonance structures on.

The further reference signs illustrated in FIG. 2 have already been described in the figure description associated with FIG. 1 and will therefore not be explained any further.

FIG. 3 shows a schematic illustration of an image pixel apparatus for detecting electromagnetic radiation in accordance with yet another embodiment of the disclosure.

In a departure from the embodiment shown in FIG. 1, in the embodiment shown in FIG. 3, the image pixel apparatus 100 furthermore comprises a second plasmonic resonance structure device 115. Furthermore, in the embodiment shown in FIG. 3, the electromagnetic radiation 1 impinges on the absorption structure device 110 of the image pixel apparatus 100 via the two plasmonic resonance structure devices 115.

Therefore, a reflector device 113 is omitted in the image pixel apparatus 100 illustrated in FIG. 3.

The further reference signs illustrated in FIG. 3 have already been described in the figure description associated with FIG. 1 and will therefore not be explained any further.

FIG. 4 shows a schematic illustration of a sensor array for detecting electromagnetic radiation in accordance with yet another embodiment of the disclosure.

A sensor array 10 for detecting electromagnetic radiation 1 can comprise a plurality of image pixel apparatuses 100. The image pixel apparatuses 100 are for example coupled to a substrate 20 and arranged in the form of an array. The individual image pixel apparatuses 100 can be embodied in rectangular, square or polygonal fashion.

In this case, circular or square, approximately 1 millimeter thick wafers are designated as substrate 20. The wafers can comprise mono- or polycrystalline semiconductor materials and generally serve as substrate for electronic systems. Silicon, germanium, gallium arsenide, silicon carbide or indium phosphide can be used as semiconductor materials.

FIG. 5 shows a schematic illustration of a flow chart of a method for detecting electromagnetic radiation by means of an image pixel apparatus in accordance with yet another embodiment of the disclosure.

A first method step involves forwarding 51 the electromagnetic radiation 1 to an absorption structure device 110 by means of a plasmonic resonance structure device 115 and absorbing the electromagnetic radiation 1 and taking up the absorbed electromagnetic radiation 1 as a quantity of heat.

A second method step involves detecting S2 the changes in an electrical property of the at least one detection element 125, said changes being caused by the quantity of heat taken up by the absorption structure device 110, in order thereby to detect the electromagnetic radiation 1.

Although the present disclosure has been described above on the basis of preferred exemplary embodiments, it is not restricted thereto, but rather can be modified in diverse ways. In particular, the disclosure can be varied or modified in manifold ways, without departing from the essence of the disclosure.

What is claimed is:

1. An image pixel apparatus for detecting electromagnetic radiation, comprising:
    an absorption structure device configured to absorb the electromagnetic radiation and to take it up as a quantity of heat;
    at least one plasmonic resonance structure device arranged on the absorption structure device, the plasmonic resonance structure device being configured to forward the electromagnetic radiation to the absorption structure device; and
    a detection device having at least one detection element operably connected to the absorption structure through a thermal bridge and configured to detect changes in an electrical property of the at least one detection element that are caused by the quantity of heat taken up by the absorption structure device so as to detect the electromagnetic radiation.

2. The image pixel apparatus according to claim 1, wherein the absorption structure device is configured in a manner spaced apart from the detection device.

3. The image pixel apparatus according to claim 2, wherein the absorption structure device is configured at a distance from the detection device amounting to a multiple of one quarter of a wavelength of the electromagnetic radiation.

4. The image pixel apparatus according to claim 2, wherein the a least one detection element of the detection device is coupled to the absorption structure device via at least one thermal bridge.

5. The image pixel apparatus according to claim 1, wherein the absorption structure device is configured as a layer that absorbs the electromagnetic radiation.

6. The image pixel apparatus according to claim 5, wherein an optical thickness of the absorbent layer is a multiple of one quarter of a wavelength of the electromagnetic radiation.

7. The image pixel apparatus according to claim 1, wherein the at least one plasmonic resonance structure device is configured on at least one surface of the absorption structure device.

8. The image pixel apparatus according to claim 1, wherein the at least one plasmonic resonance structure device is configured as a metallic plasmonic resonance structure device.

9. The image pixel apparatus according to claim 1, further comprising a reflector device configured on at least one surface of the absorption structure device.

10. The image pixel apparatus according to claim 1, further comprising a coupling device configured to couple one or more of the detection device and the absorption structure device to a substrate.

11. The image pixel apparatus of claim 1, wherein:
the thermal bridge extends downwardly from the absorption structure device;
the plasmonic resonance structure device is positioned above a lower portion of the thermal bridge and beneath the absorption structure device; and
the detection device is positioned beneath the lower portion of the thermal bridge.

12. A sensor array for detecting electromagnetic radiation, comprising:
at least one image pixel apparatus including:
an absorption structure device configured to absorb the electromagnetic radiation and to take it up as a quantity of heat;
at least one plasmonic resonance structure device arranged on the absorption structure device, the plasmonic resonance structure device being configured to forward the electromagnetic radiation to the absorption structure device; and
a detection device having at least one detection element operably connected to the absorption structure through a thermal bridge and configured to detect changes in an electrical property of the at least one detection element that are caused by the quantity of heat taken up by the absorption structure device so as to detect the electromagnetic radiation,
wherein the at least one image pixel apparatus is coupled to a substrate.

13. The image pixel apparatus of claim 12, wherein:
the thermal bridge extends downwardly from the absorption structure device;
the plasmonic resonance structure device is positioned above a lower portion of the thermal bridge and beneath the absorption structure device; and
the detection device is positioned beneath the lower portion of the thermal bridge.

14. A method for detecting electromagnetic radiation with an image pixel apparatus, comprising:
forwarding the electromagnetic radiation to an absorption structure device with a plasmonic resonance structure device;
absorbing the electromagnetic radiation and taking up the absorbed electromagnetic radiation as a quantity of heat;
transferring the quantity of heat from the absorption structure device to a detection device through a thermal bridge positioned between the absorption structure device and the detection device; and
detecting the changes in an electrical property of at least one detection element of the detection device that are caused by the quantity of heat taken up by the absorption structure device so as to detect the electromagnetic radiation.

15. The method of claim 14, wherein
forwarding the electromagnetic radiation to the absorption structure device with the plasmonic resonance structure device comprises forwarding the electromagnetic radiation to an absorption structure device located above the plasmonic resonance structure device; and
transferring the quantity of heat from the absorption structure device to the detection device through a thermal bridge positioned between the absorption structure device and the detection device comprises transferring the quantity of heat from the absorption structure device to a detection device located beneath the plasmonic resonance structure device.

* * * * *